No. 796,825. PATENTED AUG. 8, 1905.
P. T. DODGE.
LOGOTYPE MACHINE.
APPLICATION FILED NOV. 23, 1904.

Witnesses
Inventor
P. T. Dodge

No. 796,825. PATENTED AUG. 8, 1905.
P. T. DODGE.
LOGOTYPE MACHINE.
APPLICATION FILED NOV. 23, 1904.

No. 796,825. PATENTED AUG. 8, 1905.
P. T. DODGE.
LOGOTYPE MACHINE.
APPLICATION FILED NOV. 23, 1904.

UNITED STATES PATENT OFFICE.

PHILIP T. DODGE, OF BROOKLYN, NEW YORK, ASSIGNOR TO MERGENTHALER LINOTYPE COMPANY, A CORPORATION OF NEW YORK.

LOGOTYPE-MACHINE.

No. 796,825.        Specification of Letters Patent.        Patented Aug. 8, 1905.

Application filed November 23, 1904. Serial No. 234,069.

*To all whom it may concern:*

Be it known that I, PHILIP T. DODGE, of Brooklyn, county of Kings, and State of New York, have invented a new and useful Improvement in Logotype-Machines, of which the following is a specification.

In the commercial Mergenthaler linotype-machine, such as represented in United States Letters Patent No. 557,000, the matrices representing the individual characters for an entire line of print are assembled in line with wedge spacers, the spacers adjusted to elongate and justify the line, and the line applied momentarily to close a slotted mold in which a continuous linotype or line-printing slug is cast against the matrices.

The aim of my invention is to adapt the linotype-machine by a simple modification to produce justified lines of logotypes, the spaces between the words to effect justification being formed integral with the logotypes. To this end I preserve the general organization of the machine; but instead of casting a single slug or linotype from the entire justified line of matrices I subdivide the line after composition and justification into word groups and present these groups one at a time to the mold in order to produce a succession of logotypes, the mold being automatically adjusted to a length representing each word plus the space necessary to separate it from the next word.

In my improved machine the matrices and spacers may be held in their ordinary magazines and assembled in line by the ordinary keyboard and escapement mechanism and the wedge spacers adjusted through the line as usual to justify the same to the predetermined length.

The expansion of the line is limited by jaws or abutments, so that the advance of the wedge spacers endwise through the line is limited by the total amount of space required to fill out or justify the line. I utilize this limitation of the advance of the spacers to control the adjustment of the mold in order that it may add automatically to the slugs or logotypes cast therein blank portions or spaces of suitable width for the justification of the line.

After the logotypes have been cast the matrices and spacers may be returned to the magazine by the ordinary elevating and distributing mechanisms. Inasmuch as the assembling and distributing mechanisms are not of my invention and may be of ordinary construction, I have limited the drawings herein to those parts of the machine which are necessary to an understanding of my improvement.

Referring to the drawings, Fig. 17 is a side view of a cam and mechanism for shifting the matrix-line.

I employ as the basis of the machine the individual letter-matrices and the expansible spacers consisting of two oppositely-tapered wedges connected by sliding joints, as shown and described in United States Letters Patent No. 436,532 and used in the commercial linotype-machines of the present day.

Referring to the drawings, A represents the assembling-elevator, such as used in the linotype-machine, its upper end being horizontally channeled to receive the matrices B and wedge spacers C, as shown in the various figures.

The matrices and spacers will be stored in magazines and assembling devices employed for delivering the matrices and spacers successively to the assembler A, as in the ordinary linotype-machine.

D D' represent two fingers depending from horizontal slides mounted in the main frame and connected by a contractile spring $D^2$, which tends to draw the fingers together. These parts constitute what is commonly known as the "transfer-carriage" of a linotype-machine.

Figures 1, 2, 3, 4, 5:
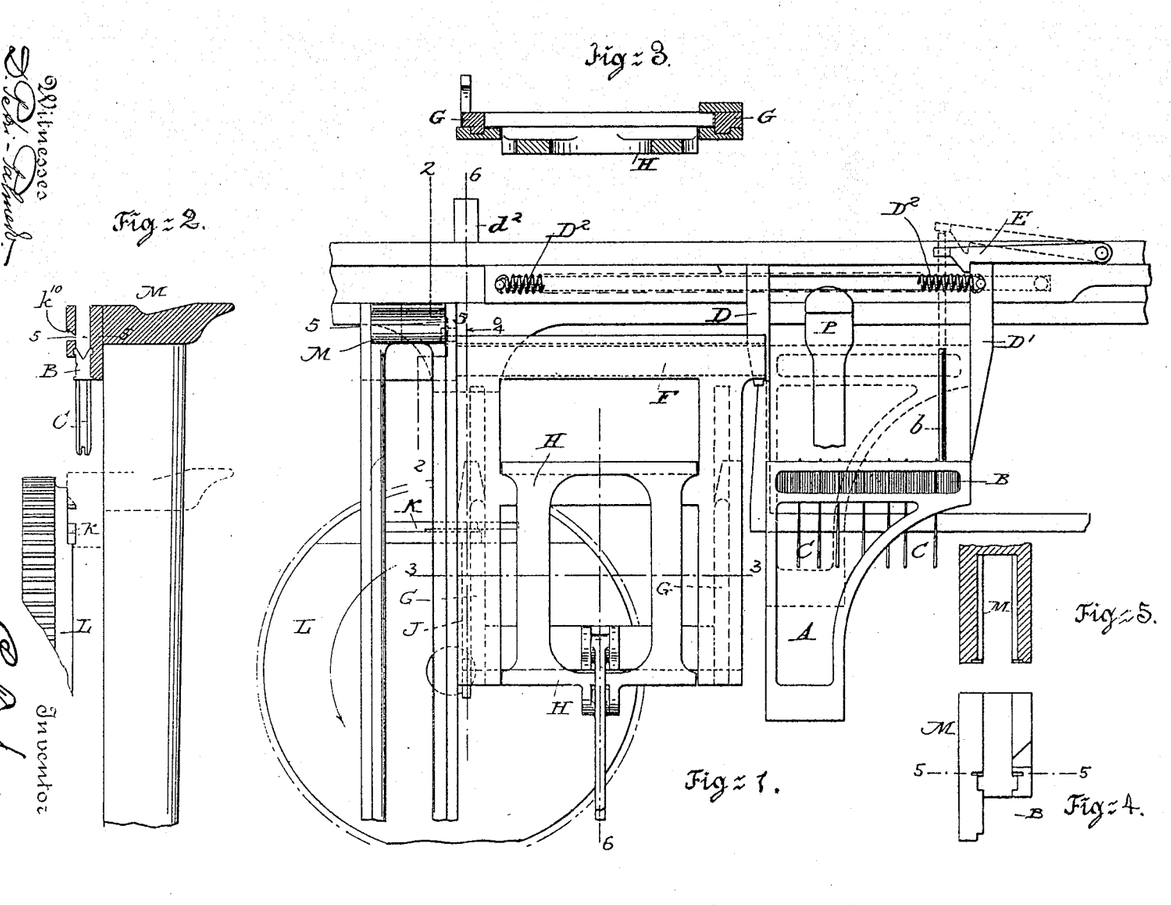
Figure 1 is a front view of the mechanism for receiving and justifying the composed line of matrices and for subdividing the line and casting therefrom the logotypes with justifying-spaces thereon.
Fig. 2 is a vertical section through the elevator or presentation slide on the line 2 2 of the preceding figure.
Fig. 3 is a horizontal section on the line 3 3 of the preceding figure, showing particularly the means for limiting the expansion of the matrix-line and for operating the justifying-wedges.
Fig. 4 is a side elevation of the elevator for carrying the groups of matrices successively to the mold looking in the direction of the arrow 4 in Fig. 1.
Fig. 5 is a horizontal section through the elevator on the line 5 5 of Figs. 1, 2, and 4.
Figures 9, 13:
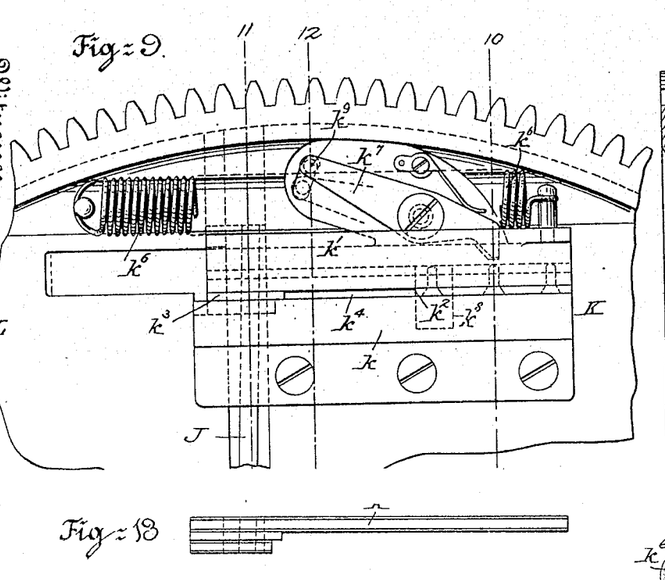
Fig. 9 is a rear view of the adjustable mold and attendant parts. Fig. $9^a$ is a horizontal section through the mold and adjacent parts with a group of matrices in operative position. Fig. $9^b$ is an elevation of a word group of matrices and the adjacent spacer as presented to the mold.
Figs. 13 and 14 are respectively an edge view and a plan view of the adjustable mold-liner for determining the length of the logotype.
Figure 9A:
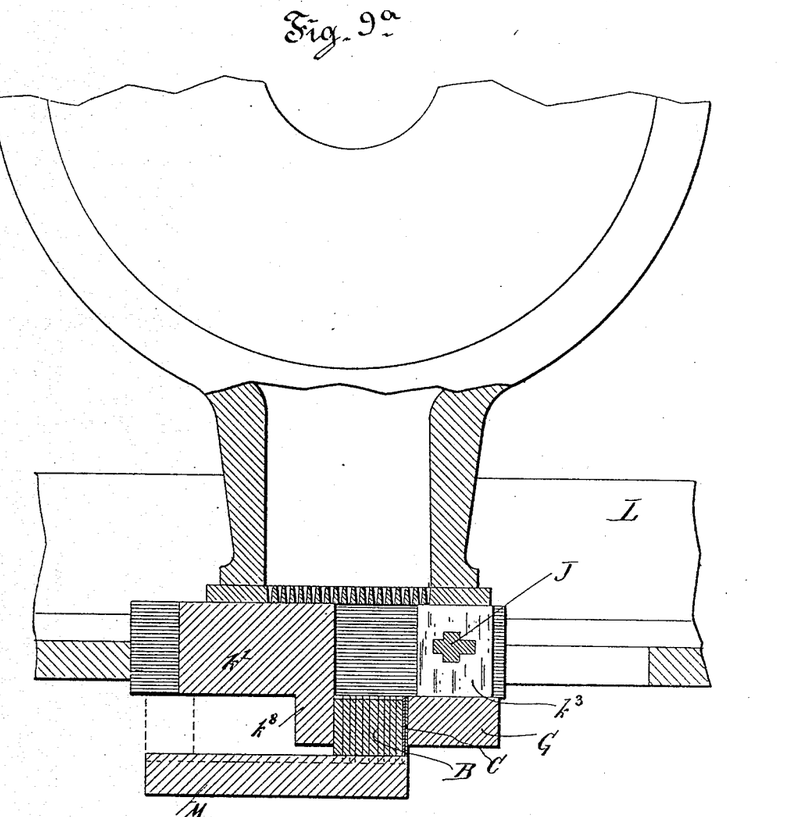
Figure 9B:
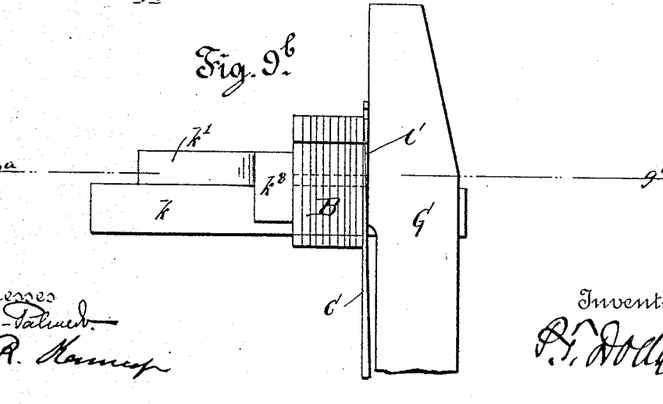
Figure 11:
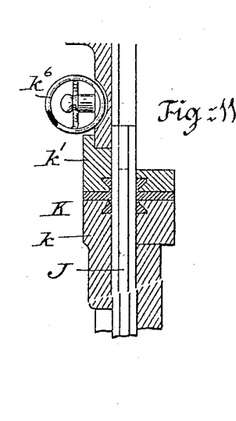
Figure 14:
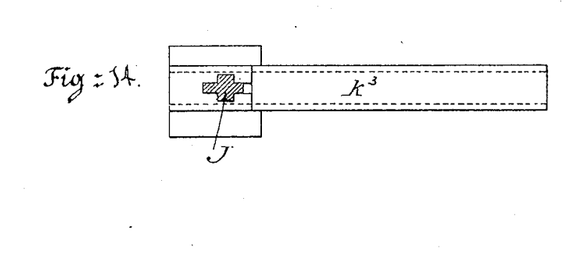

After the composition of the line in the assembler A is completed it is lifted in the ordinary manner to carry the line upward between the fingers D D', as shown by dotted lines in Fig. 1. During this action the fingers D D' are held apart in the usual manner, so that the line may ascend freely between them. As the assembler completes its upward movement the pin $b$ thereon raises a detaining-catch E out of engagement with the finger D', allowing the latter to move to the left until the line is confined between the two fingers D D', both of which are then moved to the left by the usual operating devices in order to carry the line out of the assembler A and into a stationary channel or support F, as shown in Fig. 1, this channel being known in the linotype-machine as the "intermediate channel." While the line of matrices and spacers is thus seated in the intermediate channel and at rest the frame G, having two upright side arms, rises (see Fig. 21) and embraces the arms D D' of the transfer-carriage in order to limit their separation, and thereby determine the length of the line when justified. While the parts are in this position the justifying-slide H, guided in the main frame, rises and pushes the wedge spacers C upward through the matrix-line, causing them to justify or elongate the line to the prescribed length. The confinement of the matrix-line endwise limits the separation of the matrices by the spacers, so that the matrices in turn limit the rise of the spacers through the line. In other words, the resistance of the matrices arrests the advance of the spacers as soon as the line is filled out tightly between the confining devices. The distance to which the spacers can advance through the line depends not only on the extent to which the line requires to be elongated, but also on the number of words and spaces in the line, and this because the total shortage of the line must be divided by the number of word-spaces—that is to say, by the number of words in the line less one. I therefore utilize the limited advance of the spacers to control the adjustment of the mold in order that it may add to the logotypes for each line beyond the type characters thereon extensions or blank spaces appropriate to that line. This result is secured by providing the space-driving slide H with an arm $h$, arranged to lift an upright wedge J, which in turn acts, as shown in Figs. 9, 11, and 14, to adjust a sliding liner or plate $k^3$, forming one end of the slot or cell in the mold K and serving to change the length of the slot and of the logotype cast therein. This adjustment of the mold is independent of the adjustment to the length of the word, which will be presently explained, and is solely for the purpose of securing justification.

The wedge J consists, as shown in Figs. 9, $9^a$, 13, and 14, of a bar with parallel sides having on opposite sides ribs standing in an inclined or oblique position. The bar or wedge is guided in a groove in the mold-disk and extended through the mold. The inclined ribs are seated in the sliding liner $k^3$, as shown in Figs. 9, 11, and 14, so that although the body of the wedge or bar slides vertically and without lateral motion the ribs on its edges act with wedging effect to move the liner $k^3$ forward or backward.

It will be understood, of course, that the opening through the stationary part of the mold is of such size that the inclined ribs of the wedge member do not engage therein, the engagement being limited to the movable liner.

The mold K is mounted in a vertical intermittingly-rotated wheel L, by which the mold is presented alternately at the casting and at the ejecting positions, as in the linotype-machine. The mold presents a horizontal slot or mold proper, $k^4$, open at both front and rear, so that when closed on one side by the matrices representing a word it may receive molten metal at the opposite side from a coöperating pot and pump, as in the linotype-machine.

Figure 10:
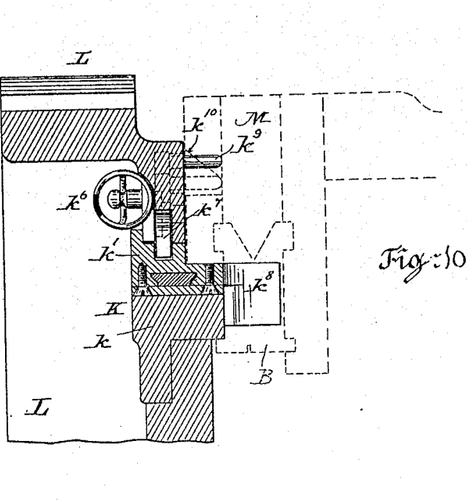
Figs. 10, 11, and 12 are vertical sections on the correspondingly-numbered lines of Fig. 9.

The mold consists of a lower fixed member $k$, an upper member $k'$, arranged to slide endwise and provided with a shoulder $k^2$, forming one end of the slot or cell, and the sliding intermediate liner $k^3$, already referred to, forming the opposite side of the cell. A spring $k^6$ is connected with the sliding mold-top $k'$ and tends to move the same to the left for the purpose of shortening the mold-slot. A spring-actuated dog $k^7$, mounted on the mold-wheel, engages the sliding member $k'$ and holds the same normally in its extreme position to the right. In this position of the parts the mold-slot is of its extreme length, adapted to form a logotype bearing the longest word plus the widest space required for justification. This sliding member of the mold carries also a front projecting jaw or abutment $k^8$, intended to bear against one end of the matrix-line when it is presented to the mold to assist in confining the matrices closely together and in position to close the face of the mold, as indicated by dotted lines in Fig. 10.

Figures 21, 22, 23, 24:
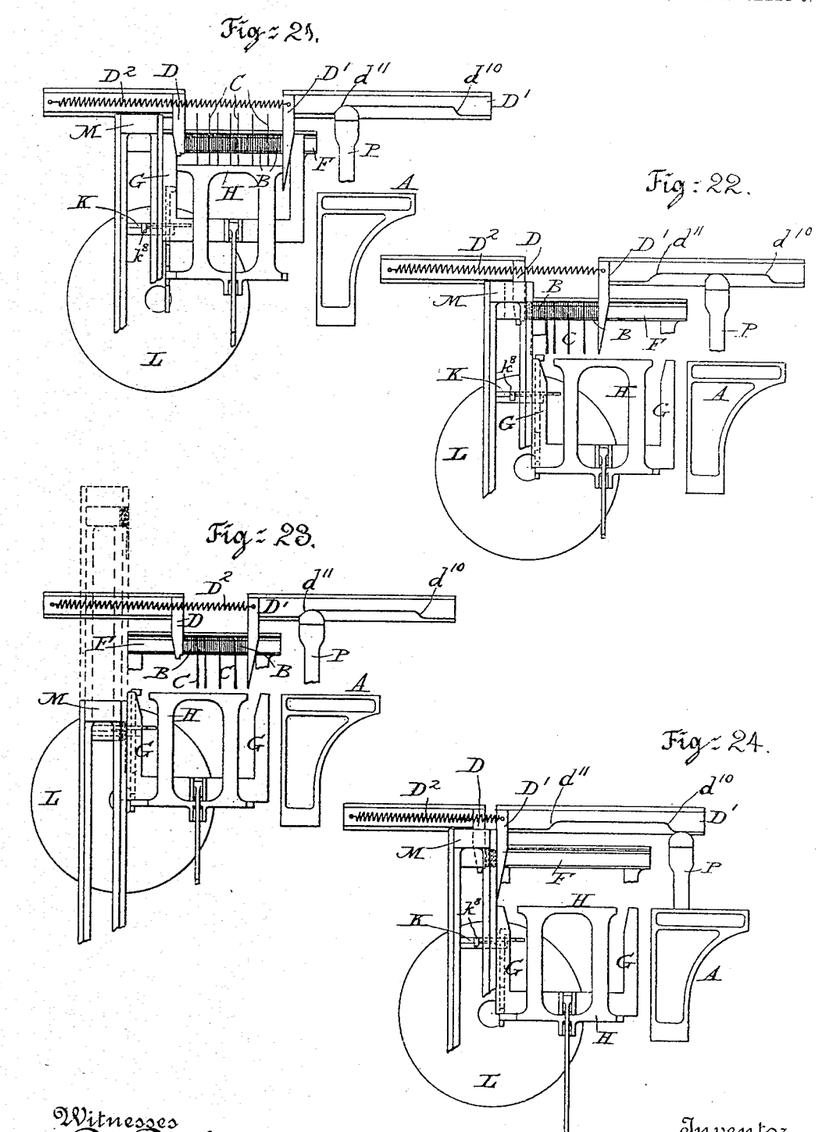
Figs. 21, 22, 23, and 24 are diagrams illustrating the movements of the principal parts for handling the matrices and adjusting the mold.

After the composed line of matrices has been justified and the mold-liner $k^3$ automatically adjusted with reference to the production of the spaces required to justify the line the casting operation proceeds as follows: The justifying-slide H and the confining-arms G descend, thus releasing the transfer-carriage with the composed line therein and permitting the spacing-wedges to fall to their first positions without disturbing the position of the wedge J or the mold-liner, which parts are fitted with sufficient friction to cause them to remain in position. Springs or other retaining devices may be provided, if desired; but they are not deemed essential. The transfer-carriage then moves to the left, as shown in Fig. 22. The end of the matrix-line enters the vertically-movable slide or elevator M of the form shown in Figs. 2, 4, and 5 until the advance is arrested by the contact of the first spacing-wedge with the side of the elevator, which is recessed to receive it. In other words, the matrices representing the first word in the line, together with the first spacer, are delivered to the elevator M, as shown in Figs. $9^a$ and 23, with the long wedge of the spacer in its lowest position. The transfer-carriage then moves with the remaining portion of the line slightly to the right and the elevator M descends, presenting the matrices for the word and the one spacer in front of the mold, as shown in Fig. 23. The line or group of matrices and the spacer are confined between the jaw $k^8$ on the sliding member of the mold and the adjacent vertical surface on the main frame.

The mold-wheel has, as usual in the linotype-machine, a motion forward and backward in an axial direction. After the matrices are lowered to the casting position the mold advances toward the matrices in order to form a close union with their edges, and at this time the pin $k^9$, protruding from the mold-latch $k^7$, encounters an inclined surface $k^{10}$ on the elevator M, the effect of which is to disengage the dog or latch from the sliding mold member $k'$, allowing the latter to move endwise under the influence of spring $k^6$ until the jaw $k^8$ compresses the line of matrices endwise, thus locking them tightly together in front of the mold-slot.

It will be observed that the matrix-confining jaw $k^8$, bearing against the matrices, limits the motion of the sliding member $k'$, and thus reduces the mold-slot to a length corresponding with that of the word to be cast, this length being, however, further increased to the extent of the justifying-space required by the prior movement of the liner $k^3$ at the opposite end of the slot.

When the wedge J is in its lowermost or normal position, the mold-slot will be of a length corresponding exactly with the length of the matrix-line presented, or, in other words, to the length of the word represented by the matrices. It is only when the wedge J is raised and the liner $k^3$ retracted that the logotype is given a length greater than the length of the word thereon.

Figures 24, 25:
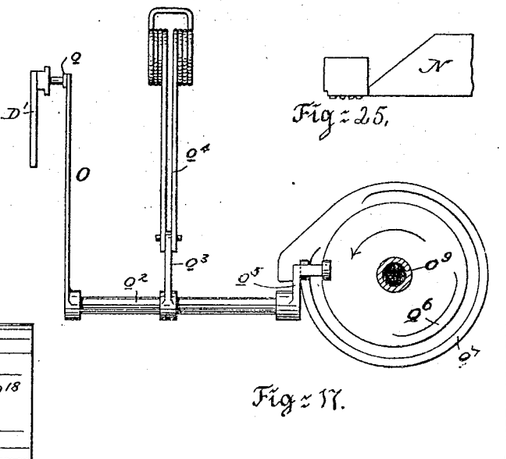
Fig. 25 is a plan view of one of the logotypes and of a device for ejecting the same from the mold.

While the matrices are locked in position in front of the mold it will be supplied from the rear with molten metal from the usual melting-pot, as in the linotype-machine. The disk and mold are then retracted and the disk given a partial rotation until it is brought opposite the usual ejector-blade N, Fig. 25, which, advancing from the rear, will drive the logotype out of the mold. This ejector is preferably beveled at the end, as shown, in order to act on the sliding member of the mold and push the same backward until it is again retained by the dog $k^7$, after which the disk continues its rotation and presents the mold again in the casting position. The elevator M next rises from the casting position to carry the contained matrices and spacer to the position shown in dotted lines in Fig. 23, so that they may be transferred to the customary devices of the linotype-machine or equivalent devices for delivering them to the distributers, by which they are returned to the magazines. The elevator then descends to its first position, the transfer-carriage again moves to the left, and the matrices representing the second word in the line, together with the second spacer, are transferred to the elevator, which then presents them in turn to the mold, which casts a second logotype with an attached space equal to that produced on the first. These operations are repeated, the words and following spacers being presented successively to the mold, which retains its adjustment, so far as the liner $k^3$ is concerned, until the last word in the line is reached. It is to be noted that although the spacers are carried with the matrices to the mold they are not relied upon to aid in justification or in determining the width of the spaces cast on the logotype, since they are always presented in the same position—that is to say, with their upper ends adjusted to the minimum thickness. The matrices representing this word are presented to the mold in the same manner as the others; but as no justifying-space is required in connection with the last word or logotype the liner $k^3$ must be restored to its inner position before the last logotype of the line is cast. For this purpose I provide mechanism shown in Figs. 6, 7, and 8. The line-transfer carriage is provided with a pin $d$, Fig. 7, and when the carriage reaches its position at the extreme left, delivering the matrices of the last word to the elevator M, this pin strikes a spring-actuated slide $d'$, which supports a vertical slide $d^2$, acted upon by a weight $d^3$ and carrying a dog $d^4$ to act upon the upper end of the wedge J. The dog or slide $d'$ sustains these parts normally in the elevated position shown in full lines in Fig. 6; but when the dog is pushed back by the pin on the transfer-carriage it releases the slide $d^2$, which immediately descends under the influence of the weight, causing the dog $d^4$ to act upon the wedge J and return it to its lower position, thereby moving the mold-liner $k^3$ to its normal or innermost position.

For the purpose of imparting the proper relative movements to the parts as above described I may employ operating devices of any suitable character; but I recommend the construction and arrangement of parts shown in the accompanying drawings and which will now be described.

Figures 6, 7, 8, 18, 19, 20:
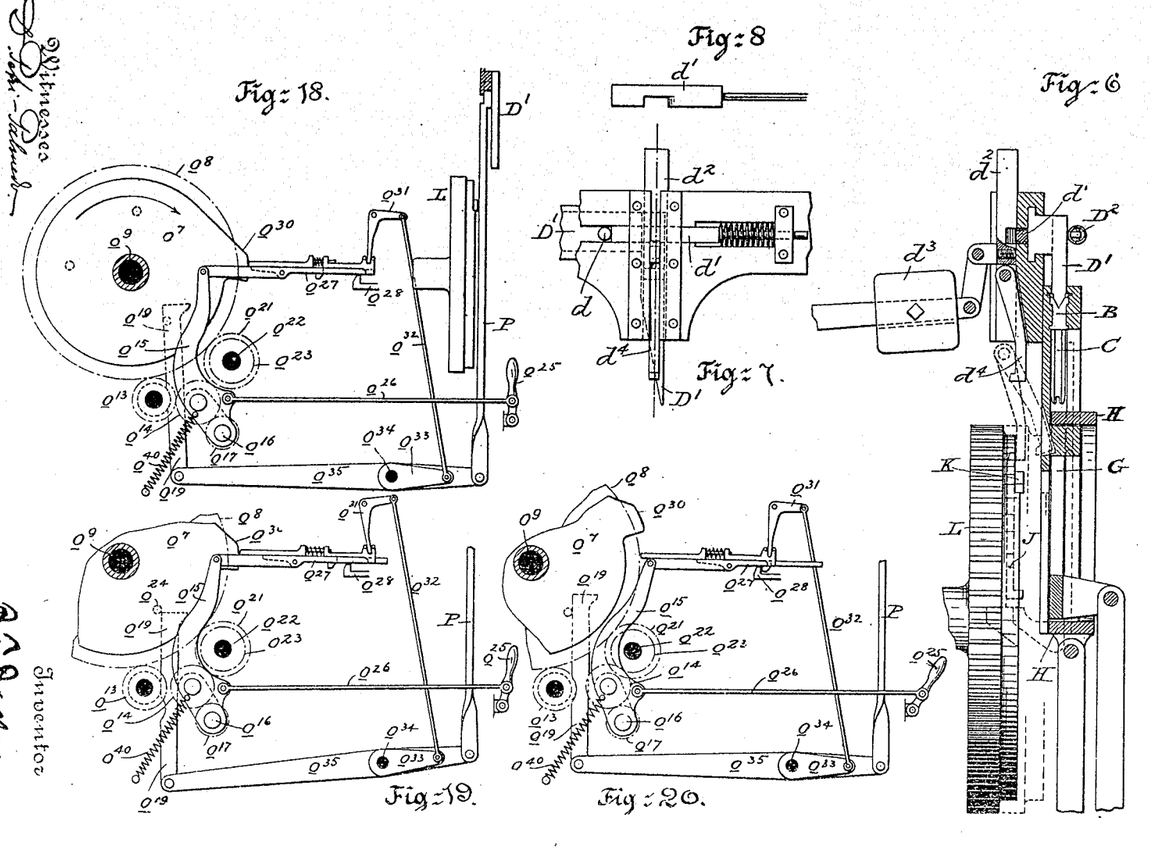
Fig. 6 is a vertical section on the line 6 6, Fig. 1.
Fig. 7 is a rear view of the mechanism for resetting the mold-adjusting wedge.
Fig. 8 is a detail view of one of the parts shown in the preceding figure.
Figs. 18, 19, and 20 are sectional elevations, looking in the direction of the arrow from the line 18 18, Fig. 15, showing various parts in their different positions.
Figure 12:
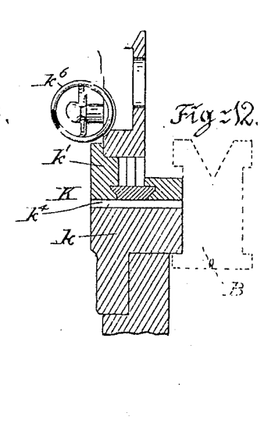
Figure 15:
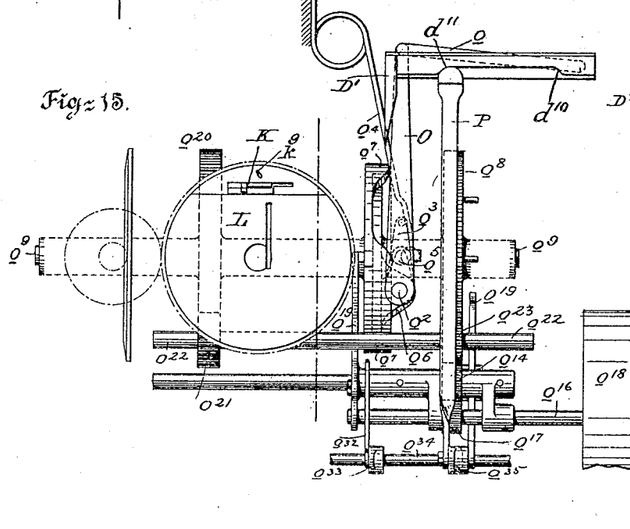
Fig. 15 is a front elevation of the mold, its carrying-wheel, and parts of the driving mechanism controlling the action of the various cams.
Figures 16, 26:
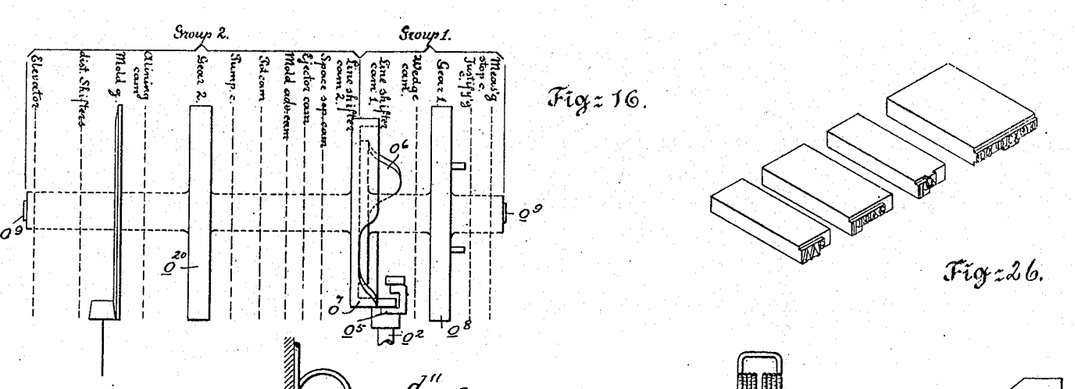
Fig. 16 is a diagram illustrating the relations of the various cams and operative parts.
Fig. 26 is a perspective view of a line of logotypes, the product of the machine.

The line-shifting carriage D D' is moved to and fro, as shown in Fig. 15, by a link $o$, attached to the upper end of a lever O, mounted at its lower end on a rock-shaft $o^2$ in the frame. This rock-shaft carries, as shown in Figs. 12 and 15, an arm $o^3$, acted upon by a spring $o^4$, which tends through the intermediate parts to move the line-shifting carriage D D' forward to the left. The shaft also carries a second arm $o^5$, acting on the side face of a cam $o^6$, secured on a shaft $o^9$, this cam serving to move the lever O in opposition to the spring $o^4$ in order to move the line-carriage backward to the right. The carriage must be moved repeatedly forward and backward to advance the successive groups of matrices toward the devices for transferring them to the mold, and as the carriage must also be restored to its original position at the extreme right, as shown in Fig. 1, to receive the composed line, I therefore provide a second cam $o^7$, which also acts on the crank-arm $o^5$, as shown in Figs. 15 and 16. These two cams are driven alternately to effect the proper movements. Motion is imparted to the cams by mechanism shown in Figs. 15 to 18, inclusive. The shaft $o^9$, carrying the cam $o^6$, is provided with a large gear-wheel $o^8$, which receives motion through a pinion $o^{13}$, which in turn receives motion intermittingly from an idle pinion $o^{14}$, carried by a swinging arm $o^{15}$, mounted loosely on the main driving-shaft $o^{16}$. This shaft is provided with a pinion $o^{17}$ and with a constantly-driven pulley $o^{18}$. Through these parts constant motion is imparted to the idle pinion $o^{14}$. A spring $o^{40}$, acting on the swinging arm, tends to draw the idle pinion $o^{14}$ into engagement with the pinion $o^{13}$ in order to impart motion through the intermediate parts to the cam $o^6$. Between the idler and the pinion there is mounted a vertically-movable bar or dog $o^{19}$, notched in one side, so that when elevated it permits the idler to engage the pinion, as shown in Fig. 18, and when depressed it throws the idler out of engagement with pinion $o^{13}$, as shown in Fig. 19, thus permitting cam $o^6$ to stop. The second cam $o^7$, has its shaft provided with a large gear-wheel $o^{20}$, which receives motion from pinion $o^{21}$ on a shaft $o^{22}$, carrying a second pinion $o^{23}$ in position to be engaged by the idler $o^{14}$ when it is pulled over to the position shown in Fig. 20. When the parts are in this position, motion will be transmitted to the cam $o^7$ while the cam $o^6$ remains at rest. The disengagement of the idler from pinion $o^{13}$ to arrest the cam $o^6$ is automatically effected by pin $o^{24}$, mounted on the gear $o^8$ and acting on the upper end of dog or bar $o^{19}$ to drive the same downward, as shown in Fig. 19. The movement of the arm $o^{15}$ to throw the second cam $o^7$ into action is effected, as shown in Fig. 20, by the hand-lever $o^{25}$, connected by link $o^{26}$ to the arm $o^{15}$. When the idler is thus thrown into engagement, the connection is maintained by a latch $o^{27}$, pivoted to the upper end of arm $o^{15}$ and engaging a fixed lip $o^{28}$. When the cam completes a revolution ending the cycle of operations, the shoulder $o^{30}$ thereon encounters the latch or dog $o^{27}$ and trips the same out of action, so that the spring will pull the idler $o^{14}$ out of engagement. The dog or latch is moved endwise into the path of the projection on the cam by means of a bell-crank $o^{31}$, connected by link $o^{32}$ to a crank-arm $o^{33}$ on rock-shaft $o^{34}$. This shaft is provided with a cross-arm $o^{35}$, one end of which carries the controlling-dog $o^{19}$, before referred to, while the opposite end carries an actuating-rod P, which is extended upward into the path of the line-transfer carriage D D', as shown in Figs. 1 and 15. As the transfer-carriage moves forward an inclined surface $d^{10}$ at its rear end depresses the rod P, thereby lifting the dog $o^{19}$ and throwing into action the parts for moving the first group of cams, including the cam $o^6$. When the carriage is finally retracted, a second inclined shoulder $d^{11}$ thereon effects a second depression of the rod P, which sets the pinion-controlling dog $o^{19}$ in an intermediate position, as shown in Fig. 19, so that the idler is out of engagement and both sets of cams are permitted to remain at rest.

As the various cams and other details for imparting motion to the minor parts are not of the essence of my invention and not necessary to an understanding of the same, I have omitted them from the drawings; but the manner in which they will be grouped is indicated in Fig. 16.

The cams for actuating the clamping-frame G and the justifying-slide are mounted on the same shaft with cam $o^6$ and gear $o^9$, while the line-shifting cam, the space-separating cam, ejector-cam, mold-pot and pump cams, distributer-shifter cam, and the elevator-cam belonging to the second group are all mounted on the same shaft with cam $o^7$ and gear $o^{20}$.

I believe myself to be the first to devise a logotype-machine wherein expansible spacers or justifiers limited in their advance by the resistance of the matrix-line are utilized to control the adjustment of the mold in order to produce upon the logotypes spaces suitable to justify the line, and I also believe myself to be the first to divide a justified line of matrices and expansible spacers and transfer the word groups, together with the spacers, to the mold, and it is to be understood that I claim such arrangement of parts in any form the mechanical equivalent of that herein described and shown.

Having described my invention, what I claim is—

1. The combination of matrices, expanding spacers and means for assembling the same in line, with means for actuating the spacers to justify the line, an adjustable mold controlled by the actuating device, and means for presenting the word groups of matrices successively to the mold.

2. The combination of matrices, expanding spacers and means for assembling the same in line, with means for actuating the spacers to justify the line, an adjustable mold controlled by the actuating device, and means for presenting the word groups of matrices and the spacers successively to the mold.

3. In a machine for producing justified lines of logotypes, means for assembling matrices and expansible spacers, a mold adjustable in length means for presenting the matrices and spacers jointly to the mold, and means controlled by the spacers to adjust the mold for justification of the line.

4. In a machine for producing justified lines of logotypes, the combination of matrices, expansible spacers and means for assembling the same in line, means for adjusting the spacers, means for limiting the length of the line, a mold, means for presenting the word groups of matrices thereto, means for adjusting the mold to correspond with the length of each word, and means controlled by the spacers to further adjust the mold to form justifying-spaces on the logotypes.

5. In a machine for producing justified lines of logotypes, matrices, expansible spacers, and means for assembling the same in line, with means for adjusting the spacers to justify the line, a mold, means for presenting the word groups of matrices to the mold, and means controlled by the spacers to adjust the mold to add justifying-spaces to the logotypes.

6. In a logotype-machine, the mold adjustable in length at both ends, in combination with a matrix group arranged to determine the length of the mold at one end, and the wedge to determine the length from the other end.

7. In a machine for producing justified lines of logotypes, the combination of matrices, expansible spacers, the means for assembling them in line, a mold adjustable in length, means for presenting the word groups of matrices and the adjacent spacers to the mold.

8. In a machine for producing justified lines of matrices, matrices, expansible spacers and means for assembling them in line, in combination with means for adjusting the spacers, means for limiting the length of the line, a mold adjustable in length at both ends, means for presenting the word groups of matrices and the following spacers to the mold, means actuated by the matrices to adjust the mold at one end, and means controlled by the spacers to adjust the mold at the other end.

9. The mold adjustable at one end, in combination with a line of matrices, expansible spacers therein, means for dividing the line into word groups and presenting the same to the mold, and means controlled by the spacers for adjusting the mold; whereby the mold is caused to add to the logotypes cast therein spaces suitable for the justification of the line.

10. The combination of the mold, the wedge to vary its length, the line of matrices and spacers, the movable frame G, to limit the length of the line, and pusher H, for adjusting the spacers and the mold-adjusting wedge.

11. The combination of the carrier for lines of matrices, the elevator horizontally channeled to receive the matrices and arranged to remove word groups from the matrix-line, the variable mold arranged to receive said groups, and means for effecting the necessary adjustment of the mold.

12. In a logotype-machine, a composed line of matrices containing spaces between the word groups, in combination with a variable mold and a carrier adapted to transfer the word groups and spaces to the mold, the spaces being employed to separate the groups from the line at the time of transference.

13. In a logotype-machine, the matrices and expansible spacers, in combination with means for assembling the same in line, means for temporarily expanding the spacers to justify the line, a variable mold, means for presenting the word groups of matrices to the mold, and means controlled by the spacers, for adjusting the mold to form justifying-spaces on the logotypes cast therein.

14. In a logotype-machine, a composed line of matrices and expansible spacers, means for expanding the spacers to justify the line, a mold to form logotypes from the word groups of matrices, means controlled by the movement of the spacers to adjust the length of the mold, and means for presenting the word groups of matrices and the spacers in their contracted form to the mold, whereby the spacers are utilized to effect the adjustment of the mold to produce the justifying-spaces on the logotypes without the direct use of the spacers at the mold for that purpose.

15. In a logotype-machine, a composed line of matrices and expanding spacers, means for expanding the spacers temporarily to justify the line, a mold arranged to coöperate with the other groups of matrices, means for adjusting the mold controlled by the adjustment of the spacers, and means for presenting the word groups of matrices together with the unexpanded spacers to the mold.

In testimony whereof I hereunto set my hand, this 22d day of November, 1904, in the presence of two attesting witnesses.

PHILIP T. DODGE.

Witnesses:
JOHN F. GEORGE,
WALTER MOBLARD.